US012584434B2

(12) United States Patent
Wolfsgruber et al.

(10) Patent No.: US 12,584,434 B2
(45) Date of Patent: Mar. 24, 2026

(54) PROTECTIVE HEAT SHIELD ENCLOSURE FOR TURBOCHARGED ENGINES

(71) Applicant: BRP-ROTAX GMBH & CO. KG, Gunskirchen (AT)

(72) Inventors: Markus Wolfsgruber, Neukirchen bei Altmuenster (AT); Johannes Wurm, Wallern an der Trattnach (AT); Philipp Albert, Gunskirchen (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/410,011

(22) Filed: Jan. 11, 2024

(65) Prior Publication Data

US 2024/0240582 A1 Jul. 18, 2024

Related U.S. Application Data

(60) Provisional application No. 63/438,671, filed on Jan. 12, 2023.

(51) Int. Cl.

*F01N 13/10* (2010.01)
*F01D 25/08* (2006.01)
*F02B 39/00* (2006.01)

(52) U.S. Cl.

CPC ........... *F01N 13/102* (2013.01); *F01D 25/08* (2013.01); *F02B 39/00* (2013.01); *F05D 2220/40* (2013.01); *F05D 2260/231* (2013.01)

(58) Field of Classification Search

CPC .... F01N 13/102; F01N 2260/20; F01D 25/08; F02B 39/00; F02B 77/11

See application file for complete search history.

(56) References Cited

U.S. PATENT DOCUMENTS 6,510,833 B1 * 1/2003 Anthon .................... F01N 13/14 123/198 E
6,647,715 B2 * 11/2003 Farkas .................. F01N 13/102 60/322

(Continued)

FOREIGN PATENT DOCUMENTS

DE 10336978 B3 * 1/2005 ............. F01D 25/26
FR 2998617 A1 * 5/2014 ......... B60R 13/0876

OTHER PUBLICATIONS

Translation DE-10336978-B3 (Year: 2025).*
Translation FR-2998617-A1 (Year: 2025).*

*Primary Examiner* — J. T. Newton
(74) *Attorney, Agent, or Firm* — BCF LLP

(57) ABSTRACT

An engine assembly for a vehicle incorporating an internal combustion engine including an exhaust manifold to discharge exhaust gases, a turbocharger coupled to the exhaust manifold via a coupling conduit to receive the discharged exhaust gases to drive the turbocharger to produce compressed air delivered to the engine, and a heat shield. The heat shield configured with a first layer including an upper section to cover the engine exhaust manifold and a lower section to cover a portion of the turbocharger, the heat shield first layer upper and lower sections configured to conform to general shapes of the engine exhaust manifold and turbocharger surfaces, respectively, and a second layer configured with a curved shape profile to cover the heat shield first layer upper and lower sections in which the heat shield second layer is spaced apart from the first layer upper and lower sections by an air gap.

16 Claims, 11 Drawing Sheets

(56) References Cited

U.S. PATENT DOCUMENTS

| | | | | |
|---|---|---|---|---|
| 8,500,398 | B1 * | 8/2013 | Walker, Jr. | F01D 25/26 415/177 |
| 11,293,325 | B2 * | 4/2022 | Anderson | F01N 3/05 |
| 2002/0166720 | A1 * | 11/2002 | Kusabiraki | F01N 13/08 181/240 |
| 2005/0126182 | A1 * | 6/2005 | Teets | F02C 3/34 60/791 |
| 2005/0193726 | A1 * | 9/2005 | Funakoshi | F01N 13/102 60/323 |
| 2008/0136217 | A1 * | 6/2008 | De Ciutiis | B62D 25/2072 296/204 |
| 2008/0292832 | A1 * | 11/2008 | Zika-Beyerlein | B60R 13/0876 428/133 |
| 2009/0197044 | A1 * | 8/2009 | Pelzer | F01N 13/148 156/219 |
| 2010/0203286 | A1 * | 8/2010 | Ziak-Beyerlein | B60R 13/0876 428/133 |
| 2011/0067952 | A1 * | 3/2011 | Oxenknecht | B60R 13/0876 428/137 |
| 2016/0290212 | A1 * | 10/2016 | Sarsfield | F01D 25/243 |
| 2019/0040787 | A1 * | 2/2019 | Niwa | F02B 37/02 |
| 2020/0256255 | A1 * | 8/2020 | Anderson | F01N 3/20 |
| 2023/0081192 | A1 * | 3/2023 | Dandachli | F01D 25/145 428/34.5 |

* cited by examiner

125

PROTECTIVE HEAT SHIELD ENCLOSURE FOR TURBOCHARGED ENGINES

CROSS-REFERENCE

The present application claims priority to U.S. Provisional Patent Application No. 63/438,671 filed on Jan. 12, 2023, which is incorporated herein in its entirety.

FIELD OF TECHNOLOGY

The present technology relates to turbocharged engine assemblies.

BACKGROUND

For internal combustion engines, such as those used in off-road vehicles (ORVs), the efficiency of the combustion process may be increased by compressing the air entering the engine. This can be accomplished using a turbocharger assembly coupled to the air intake and engine exhaust systems, such that the exhaust gases discharged by the engine are fluidly routed to the turbocharger to compress air that is then supplied to the air intake of the engine.

It should be noted that the exhaust gases discharged by the ORV engine exhaust systems and routed to the turbocharger assemblies may reach temperatures of up to 1050° C. for example. Therefore, to protect engine bay components from such high temperatures, engine exhaust systems and turbocharger assemblies are conventionally wrapped in insulating material, such as, for example, mineral wool sheets.

However, by virtue of their intended purpose and design, ORVs are often driven in various cross-country and environmental conditions, such as, for example, natural terrain, swampland, marshes, water, sand, snow, ice, etc. As such, ORVs may be exposed to environmental organic and inorganic materials, such as, hay, grass, small tree branches, fallen leaves, pine cones, debris, etc. that could be swirled up into the engine bay and become trapped. If the trapped materials come into contact with the extreme temperatures of the engine exhaust and/or turbocharger surfaces, there exists the potential that the materials may ignite and cause damage to the engine and related engine bay components.

Accordingly, there is an interest in reducing the exposure of the heated surfaces of engine exhaust units/turbocharger assemblies to environmental materials or debris.

SUMMARY

It is an object of the present technology to address at least some of the heating issues that exist in conventional approaches to turbocharged vehicles.

According to one aspect of the present technology, there is provided an engine assembly for a vehicle. The engine assembly includes an internal combustion engine including an exhaust manifold configured to discharge exhaust gases, a turbocharger, coupled to the exhaust manifold via an exhaust coupling conduit, configured to receive the discharged exhaust gases to drive the turbocharger to produce compressed air delivered to the engine, and a heat shield. The heat shield comprises a first layer including an upper section arranged to cover the engine exhaust manifold and a lower section arranged to cover a portion of the turbocharger, such that the heat shield first layer upper and lower sections are configured to conform to general shapes of the engine exhaust manifold and turbocharger surfaces, respectively. The heat shield further comprises a second layer configured with a curved shape profile to cover the heat shield first layer upper and lower sections, such that the heat shield second layer is arranged to cover the heat shield first layer upper and lower sections and configured to be spaced apart from the first layer upper and lower sections by an air gap.

In some embodiments, the first layer upper and lower sections are arranged to be spaced apart from the engine exhaust manifold and turbocharger surfaces, respectively, with an insulation material inserted therebetween.

In some embodiments, the spacing between first layer upper and lower sections and the engine exhaust manifold and turbocharger surfaces, respectively, is configured to be between approx. 10-20 mm.

In some embodiments, the air gap between the heat shield second layer and the first layer upper and lower sections is configured to be between approx. 1-5 cm.

In some embodiments, the heat shield first layer upper and lower sections comprise sheet steel with malleable properties to conform to the general shapes of the engine exhaust manifold and turbocharger surfaces, respectively.

In some embodiments, the heat shield second layer comprises sheet aluminum having malleable properties to conform to the curved surfaces of the second layer, respectively.

In some embodiments, the heat shield first layer upper and lower sections comprise top and bottom portions that are each configured with a shape having a wider lateral dimension at a first end to accommodate the engine exhaust manifold interfacing with the engine block that tapers down to a narrower lateral second end to accommodate the engine exhaust manifold interfacing with the exhaust coupling conduit.

In some embodiments, the heat shield first layer lower section is configured to cover a portion of a housing of the turbocharger.

In some embodiments, the heat shield second layer further comprises a main body section including a top end configured to have a wider lateral dimension to accommodate the engine exhaust manifold and laterally tapers down along the vertical direction to accommodate the shape of an upper portion of the turbocharger; a lower body section configured with a general concave surface to accommodate a rounded shape of a lower portion of the turbocharger; and an exhaust gas outlet section of the second layer configured with a general collar-shaped profile to accommodate the shape of a turbocharger exhaust outlet.

In some embodiments, the heat shield first and second layers are arranged and configured to control a temperature of an outer surface of the second layer to be approx. between 165° C. and 175° C. during vehicle operations.

In some embodiments, engine assembly is incorporated in an off-road vehicle (ORV).

According to another aspect of the present technology, there is provided a heat shield for a turbocharged engine, comprising a first layer including an upper section arranged to cover an exhaust manifold of the engine and a lower section arranged to cover the turbocharger, the heat shield first layer upper and lower sections configured to conform to general shapes of the engine exhaust manifold and turbocharger surfaces, respectively. The heat shield further comprises a second layer configured with a curved shape profile to cover the heat shield first layer upper and lower sections, the heat shield second layer arranged to cover the heat shield first layer upper and lower sections and configured to be spaced apart from the first layer upper and lower sections by an air gap.

In some embodiments, the first layer upper and lower sections are arranged to be spaced apart from the engine exhaust manifold and turbocharger surfaces, respectively, with an insulation material inserted therebetween.

In some embodiments, the spacing between first layer upper and lower sections and the engine exhaust manifold and turbocharger surfaces, respectively, is configured to be between approx. 10-20 mm.

In some embodiments, the air gap is configured to be between approx. 1-5 cm.

In some embodiments, the heat shield first layer upper and lower sections comprise top and bottom portions that are each configured with a shape having a wider lateral dimension at a first end to accommodate the engine exhaust manifold interfacing with the engine block and a shape that tapers down to a narrower lateral second end to accommodate the engine exhaust manifold interfacing with an exhaust coupling conduit.

In some embodiments, the heat shield first layer lower section is configured to cover a portion of a housing of the turbocharger.

In some embodiments, the heat shield second layer further comprises a main body section including a top end configured to have a wider lateral dimension to accommodate the engine exhaust manifold and laterally tapers down along the vertical direction to accommodate the shape of an upper portion of the turbocharger; a lower body section configured with a general concave surface to accommodate a rounded shape of a lower portion of the turbocharger; and an exhaust gas outlet section of the second layer configured with a general collar-shaped profile to accommodate the shape of a turbocharger exhaust outlet.

In some embodiments, the heat shield is incorporated in an off-road vehicle (ORV).

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the presented figures may not be drawn to scale, except where otherwise noted.

DETAILED DESCRIPTION

The present technology will be described relative to a four-wheel off-road vehicle (ORV) 10. However, it will be appreciated that various aspects of the present technology may equally apply to other types of ORVs such as, but not limited to, all-terrain vehicles (ATVs), ORVs having more or less than four wheels, and/or ORVs having ground-engaging members other than wheels (e.g., tracks), as well as road vehicles.

Figure 1:
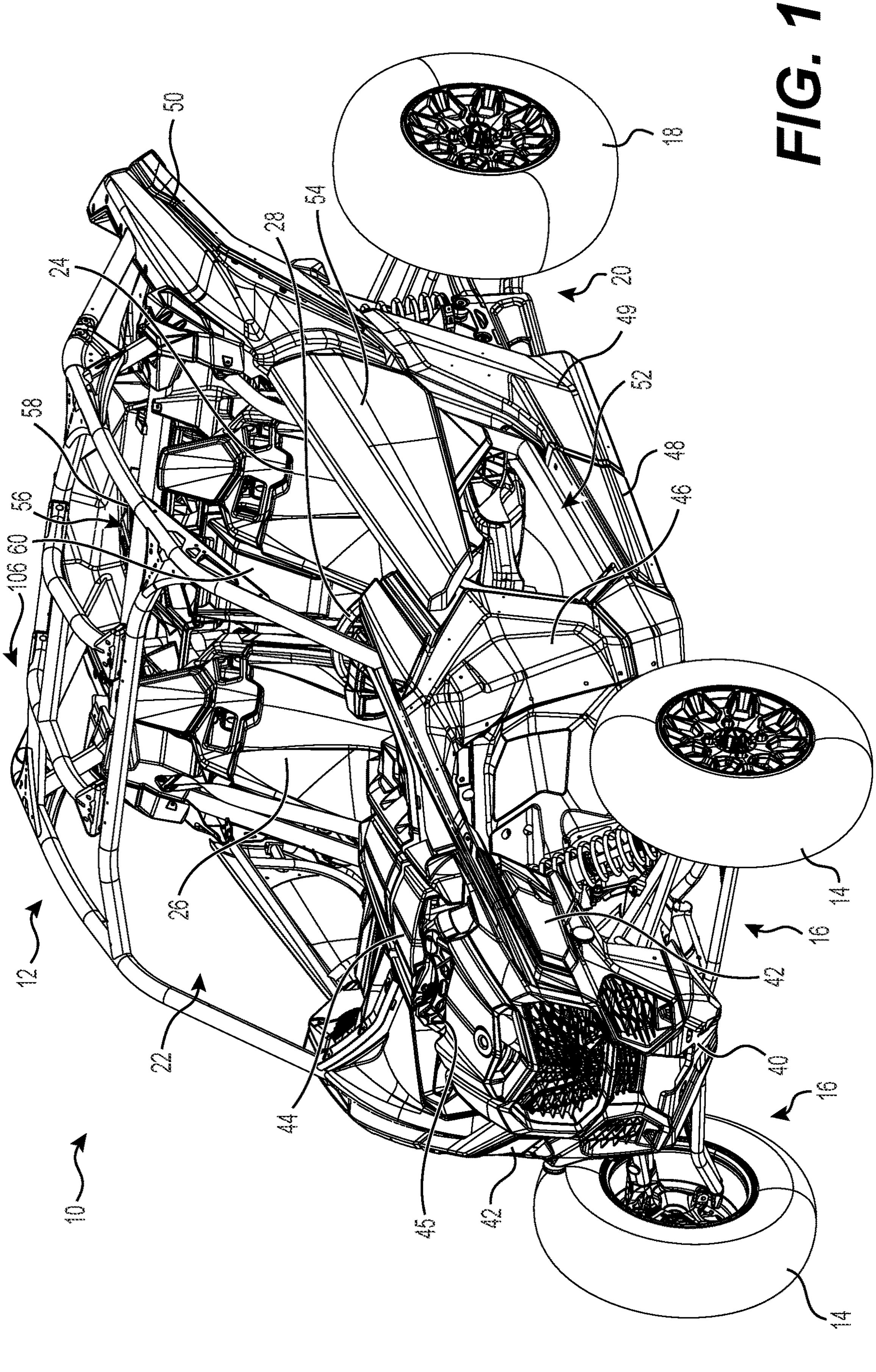
FIG. 1 is a front, left side perspective view of an off road vehicle (ORV)

The general features of the exemplary ORV 10 will be described with respect to FIGS. 1, 2. The ORV 10 has a frame 12, two front wheels 14 connected to a front of the frame 12 by front suspension assemblies 16 and two rear wheels 18 connected to the frame 12 by rear suspension assemblies 20. The ORV frame 12 has a front portion, a central portion that includes a roll cage 106, and a rear portion.

The central portion of the ORV frame 12 defines a central cockpit area 22 inside which are disposed a driver seat 24 and a passenger seat 26. In this embodiment, the driver seat 24 is disposed on the left side of the ORV 10 and the passenger seat 26 is disposed on the right side of the ORV 10. However, it is contemplated that the driver seat 24 could be disposed on the right side of the ORV 10 and that the passenger seat 26 could be disposed on the left side of the ORV 10.

A user-operated steering input device 28 is disposed in front of the driver seat 24. In this embodiment, the user-operated steering input device 28 is a steering wheel that is used is used to turn the front wheels 14 to steer the ORV 10 in a desired direction. As shown in FIG. 2, various displays and gauges 29 are disposed above the steering wheel 28 to provide information to the driver regarding the operating conditions of the ORV 10. Examples of displays and gauges 29 include, but are not limited to, a speedometer, a tachometer, a fuel gauge, a transmission position display, and an oil temperature gauge. As shown schematically in FIG. 2, a throttle operator 129 is also located in the central cockpit area 22 and operable by the driver of the ORV 10 to operate an engine thereof. In this embodiment, the throttle operator 129 is a pedal.

Figure 2:
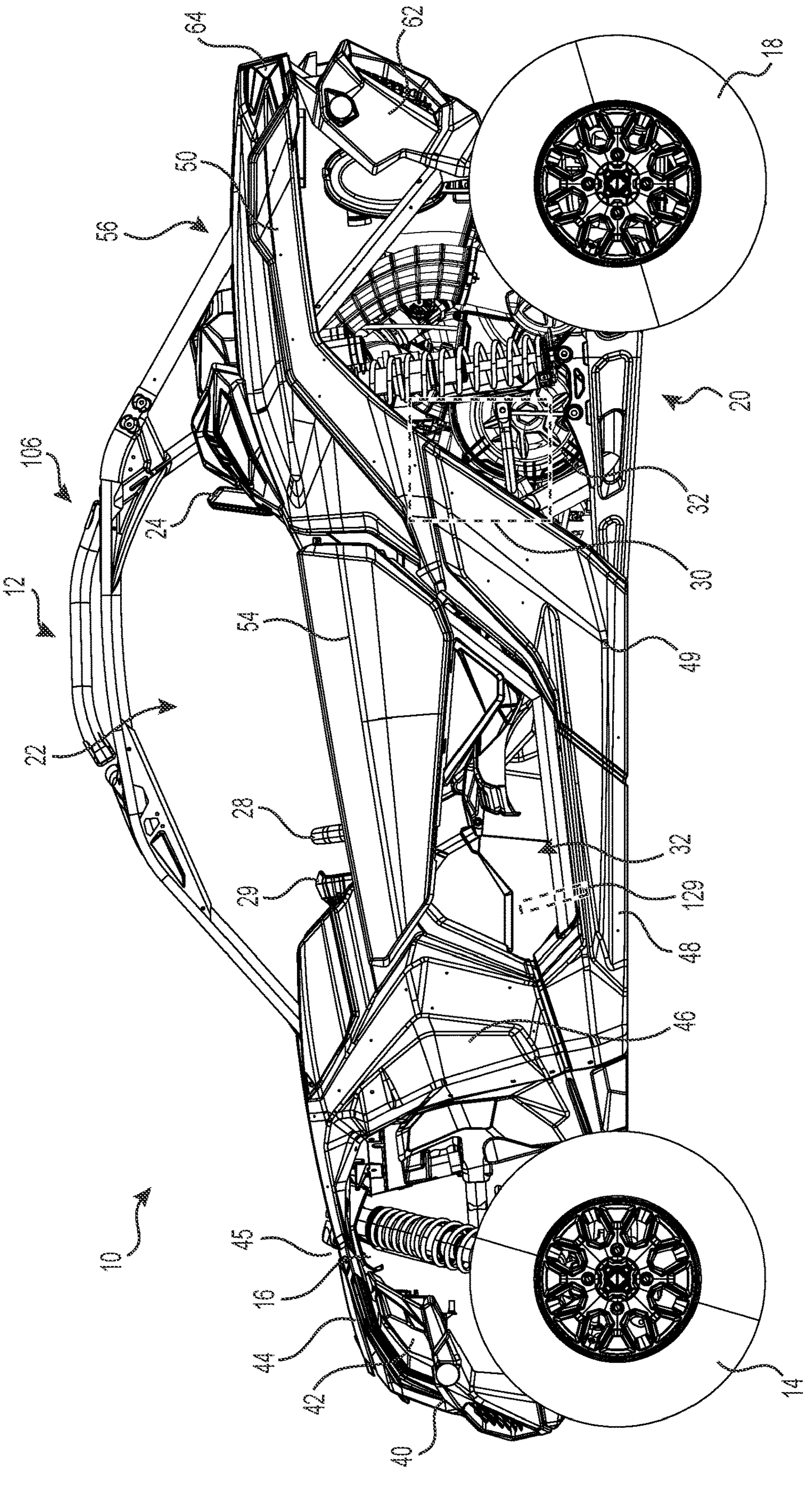
FIG. 2 is a left side elevation view of the ORV of FIG. 1.

As further shown schematically in FIG. 2, engine 30 is connected to, and supported by, the rear portion of the frame 12. As will be described in more detail below, the engine 30 is part of an engine assembly 125 that includes a turbocharger assembly 150 and an air intake manifold (not shown). In certain embodiments, the engine 30 is connected to a dual-clutch transmission (DCT) 32 disposed on a left side of the engine 30. The DCT 32 is operatively connected to a transaxle (not shown) to transmit torque from the engine 30 to the transaxle. The transaxle is disposed behind the engine 30. The transaxle is operatively connected to the front and rear wheels 14, 18, respectively, to propel the ORV

10. The engine 30, the DCT 32 and the transaxle are supported by the rear portion of the frame 12. A fuel tank (not shown) is suspended from the frame 12 in front of the driver seat 26. With this said, it will be appreciated that the engine 30 may be connected to other transmission configurations, such as, for example, a continuously variable transmission (CVT).

For purposes of simplicity and tractability, in certain embodiments, the exemplary engine 30 operates on a four-stroke engine cycle such that the engine 30 completes a power cycle with four strokes of the engine pistons. The engine 30 can thus be referred to as a four-stroke engine. However, it is contemplated that engine 30 could be configured as a two-stroke engine in other embodiments.

Figure 3:
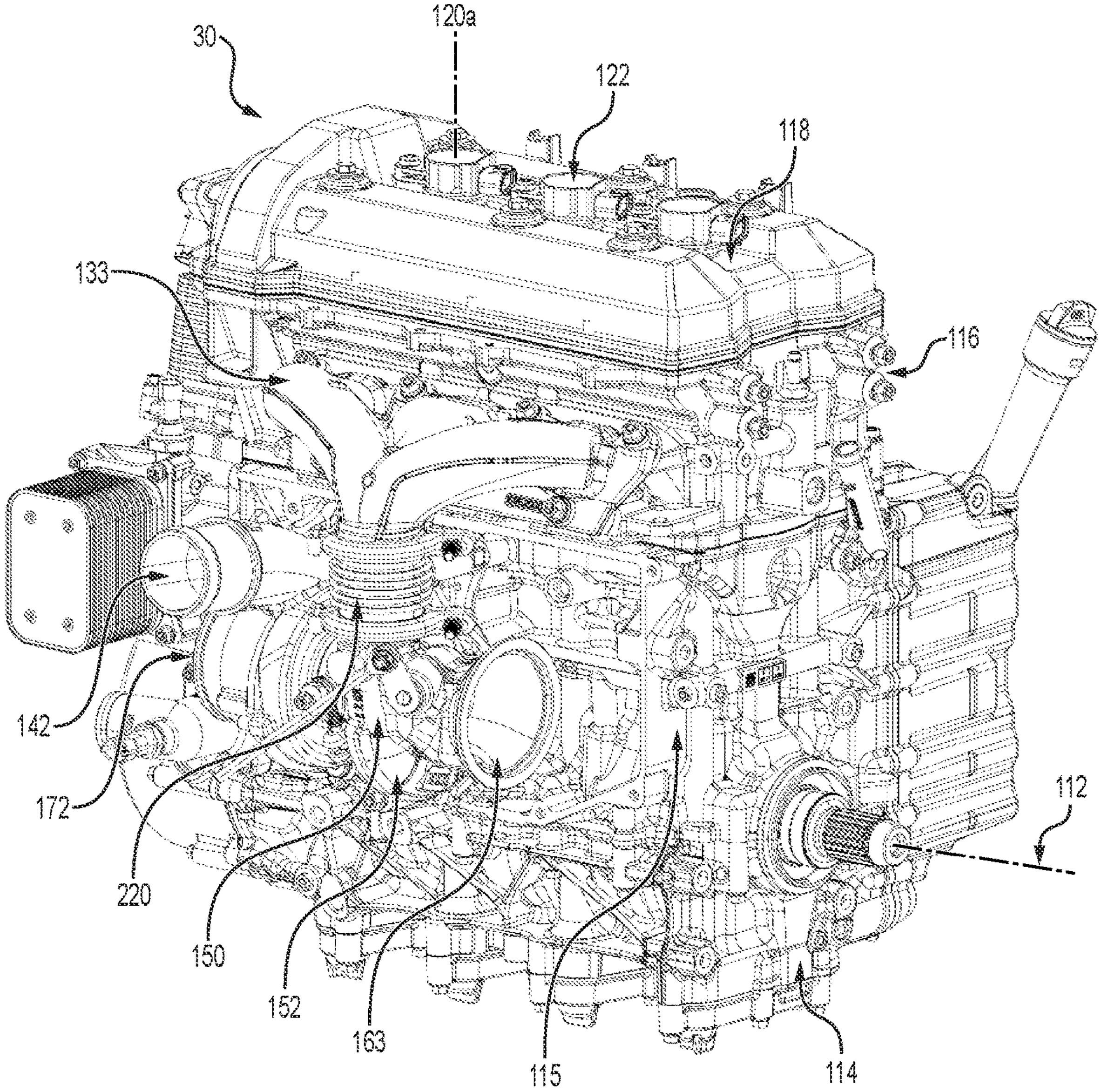
FIG. 3 is a perspective view of an exemplary ORV engine assembly.

FIG. 3 depicts the overall configuration of the ORV engine assembly 125, including the engine 30, associated engine components, and the turbocharger assembly 150, in accordance with various embodiments of the present disclosure. The engine 30 includes a crankshaft 113 (best seen in FIG. 5B) which rotates about a crankshaft axis 112. The crankshaft 113 extends laterally from the engine 30 to operatively connect, via the DCT 32 (or other suitable transmission configuration), to the wheels 14, 18 which are driven by the engine 30. The engine 30 has a crankcase 114, a cylinder block 115 disposed on and connected to the crankcase 114, a cylinder head 116 disposed on and connected to the cylinder block 115 and a valve cover 118 disposed on and connected to the cylinder head 116. The crankshaft 113 is housed within the crankcase 114.

Figure 5A:
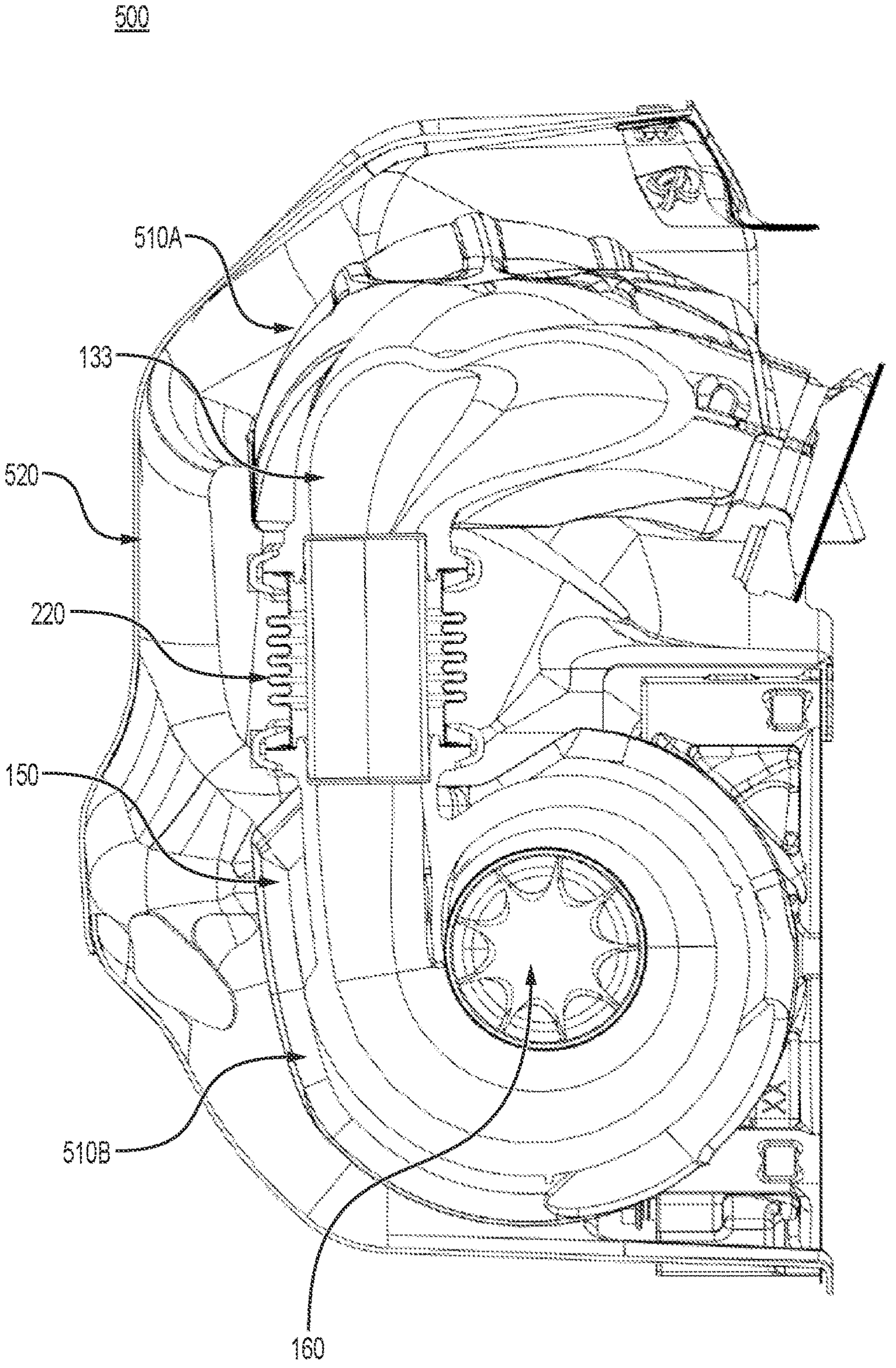
FIG. 5A is a cross-sectional view of a dual-layered protective shield enclosure for the engine exhaust manifold components and the turbocharger assembly.
Figure 5B:
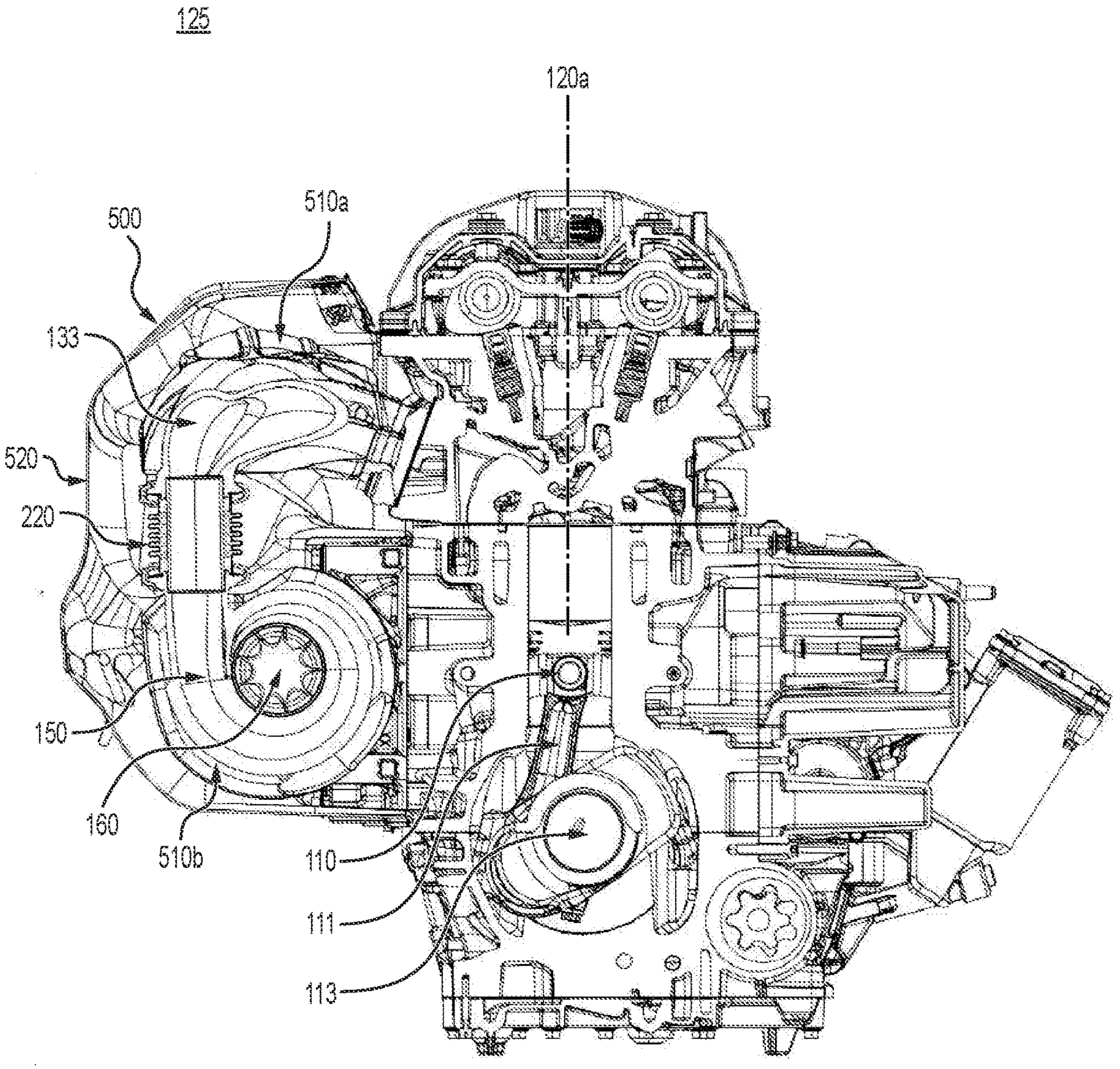
FIG. 5B is a side cross sectional view depicting the first and second layers of the dual-layer protective shield enclosure for the engine exhaust manifold components and the turbocharger mounted on the engine assembly.

With reference to FIG. 5B, the cylinder block 115 includes a number of cylinders. In the present embodiment, the cylinder block 115 has three cylinders. Each cylinder defines a cylinder axis 120*a*. A piston 110 is disposed inside each cylinder for reciprocal movement therein along the cylinder axis 120*a*. The lower end of each piston 110 is linked by a connecting rod 111 to the crankshaft 113. A combustion chamber is defined in the upper portion of each cylinder by the upper portion of the walls of the respective cylinder, the cylinder head 116 and the top of the corresponding piston 110. In the illustrated implementation of the engine 30, each cylinder has an intake passage (not shown) defined in the right side wall of the cylinder head 116 for receiving air and fuel.

A spark plug 122 is provided for each cylinder to ignite the air-fuel mixture in each cylinder. Each spark plug 122 is mounted to the cylinder head 116 and can be seen protruding out of the valve cover 118. Explosions caused by the combustion of the air-fuel mixture inside the combustion chambers of the cylinders cause the pistons 110 to reciprocate inside the cylinders. The reciprocal movement of the pistons 110 causes the crankshaft to rotate, thereby allowing power to be transmitted from the crankshaft 113 to the wheels 14, 18.

While not explicitly depicted, it will be appreciated that the engine assembly 125 includes an air intake manifold for providing air to the engine 30. The air intake manifold (not shown) is configured to define a plenum chamber therein. Three fuel injectors are mounted to the air intake manifold, in which each fuel injector delivers air to a corresponding one of the three cylinders via a corresponding runner of the air intake manifold. The fuel injectors receive fuel from a fuel tank (not shown). It is contemplated that the fuel injectors could be mounted to the cylinder head 116 and/or the valve cover 118 instead of the intake manifold for directing fuel to the cylinders directly instead of through the runners.

It will also be appreciated that the air intake manifold also includes an air intake conduit for delivering air to the plenum chamber, in which the air intake conduit is fluidly connected to a throttle body. The throttle body includes a throttle valve which regulates air flow into the engine 30. The throttle valve is operatively connected, via a throttle valve actuator, to the throttle operator of the ORV 10 such that the driver's input at the throttle operator causes actuation of the throttle valve. The plenum chamber provides a large volume for equilibrating air pressure before air enters the cylinders of the engine 30 for combustion therein.

As indicated by FIG. 3, the ORV engine assembly 125 further incorporates a turbocharger assembly 150. In operation, the exhaust gases resulting from the combustion of the air-fuel mixture in the combustion chambers are extracted from the engine 30 via an exhaust system 135, such that at least a portion of the exhaust gases are redirected to the turbocharger assembly 150.

Figure 4:
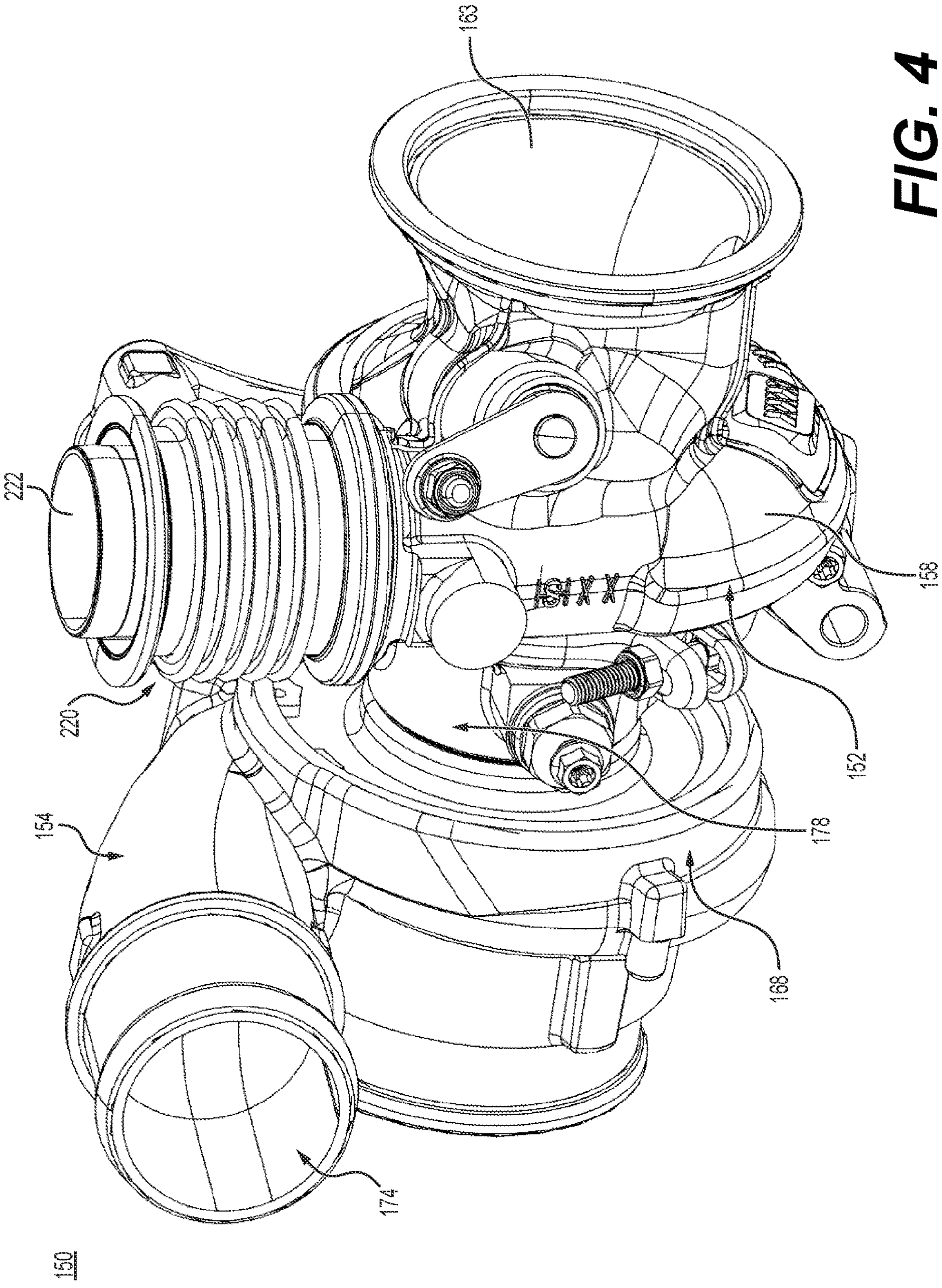
FIG. 4 is a perspective isolated view of an exemplary turbocharger assembly that is integrated with the ORV engine assembly.

To this end, FIG. 4 illustrates an exemplary configuration of the ORV turbocharger assembly 150. The turbocharger 150 is configured to be in fluid communication with respective intake and exhaust ports of the cylinders of the engine 30, so as to receive exhaust gases from the engine 30, via an exhaust manifold 133 (see FIG. 3), and to route compressed air into the cylinders via the intake ports. As shown, the exemplary turbocharger assembly 150 includes a turbine 152 and a compressor 154 which are rotatably linked to one another via a shaft (not shown) to define an axial direction of the turbocharger assembly 150.

The turbine 152 of the turbocharger assembly 150 includes a turbine housing 158 and a turbine wheel 160 (see FIGS. 5A, 5B) housed within the turbine housing 158. The turbine housing 158 is fluidly connected to the exhaust ports of the cylinders via the exhaust manifold 133 and exhaust pipe to receive the exhaust gases discharged therefrom. As such, the turbine housing 158 defines an inlet 222 in fluid communication with the exhaust ports of the engine's cylinders, via the engine exhaust manifold 133, for the exhaust gases discharged by the engine 30 to enter the turbine housing 158.

The turbine housing 158 also defines an outlet 163 for expelling the exhaust gases therefrom. The exhaust outlet 163 is in fluid communication with the exhaust system 135 of the engine 30. The turbine wheel 160 is mounted to an end of the shaft (not shown) of the turbocharger assembly 150 for rotation therewith and is driven by the exhaust gases received in the turbine housing 158 through its inlet 222. In operation, the exhaust gases that enter the turbine housing 158 cause the turbine wheel 160, and thus the shaft to which the turbine wheel 160 is mounted, to rotate about an axis of the shaft.

The turbocharger assembly 150 further includes a compressor unit 154 comprising a compressor housing 168 and a compressor wheel (not shown) housed within the compressor housing 168. The compressor housing 168 defines an inlet 172 (see FIG. 3) through which ambient air enters the compressor housing 168. The compressor housing 168 also defines an outlet 174 in fluid communication with the intake ports of the cylinders. The compressor wheel is mounted to a second end of the shaft connected to the turbine wheel 160 for rotation therewith and is driven by rotation of the shaft. Thus, during operation of the turbocharger assembly 150, the compressor wheel rotates together with the turbine wheel 160 to cause air/gasses to be fluidly drawn into the compressor housing 168 through the inlet 172. The air/gasses are compressed and then expelled through the outlet 174 toward the intake ports of the cylinders.

As noted above, the turbine housing 158 of the turbocharger assembly 150 is in fluid communication with the exhaust system 135 of engine assembly 125 so as to receive the exhaust gas discharged by the engine 30. That is, as shown in FIG. 3, the exhaust system 135 includes an exhaust manifold 133 fluidly connected to the exhaust outlets of the cylinders of the engine 30 and a coupling conduit 220 fluidly connected between the exhaust manifold 133 and the turbocharger 150. The coupling conduit 220 directs the flow of the exhaust gas, from the exhaust manifold 133, to the exhaust turbine 152 of the turbocharger 150 to drive the turbocharger air compressor 154. As seen in FIG. 4, the coupling conduit 220 manifests a flexible tube design that is fastened to the turbine housing 158 by a clamp. It is contemplated that, in other embodiments, the conduit 220 could be integrally formed with the turbine housing 158 of the turbocharger 150.

It will be appreciated that the exhaust gases discharged by engine assembly 125 may reach high temperatures, such as temperatures of up to 1050° C. in some embodiments. Consequently, because these high temperature exhaust gases are fluidly routed from the exhaust manifold 133, through coupling conduit 220, and onto turbocharger 150, the outer surfaces of these components may also reach such high temperatures through heat conduction.

To this end, the present disclosure provides a dual-layered protective heat shield enclosure 500 for an ORV turbocharged engine assembly 125. The dual-layered protective heat shield enclosure 500 is configured to provide an outer surface 520 that radiates heat below igniting temperatures of environmental materials (e.g., between approx. 165° C. and 175° C.) while minimizing the exposure of the engine exhaust manifold 133 and turbocharger 150 units, respectively, to environmental materials and debris.

Accordingly, FIG. 5A depicts a cross-sectional view of a dual-layered protective heat shield enclosure 500 for an ORV turbocharged engine assembly 125, in accordance with the various embodiments of the present disclosure. Relatedly, FIG. 5B depicts a side cross sectional view depicting the first and second layers 510, 520 of the dual-layer protective shield enclosure 500 for the engine exhaust manifold 133 and turbocharger 150 units mounted on the engine assembly 125. The heat shield enclosure 500 comprises a first layer upper section 510A, a first layer lower section 510B, and a second layer 520.

Figure 6A:
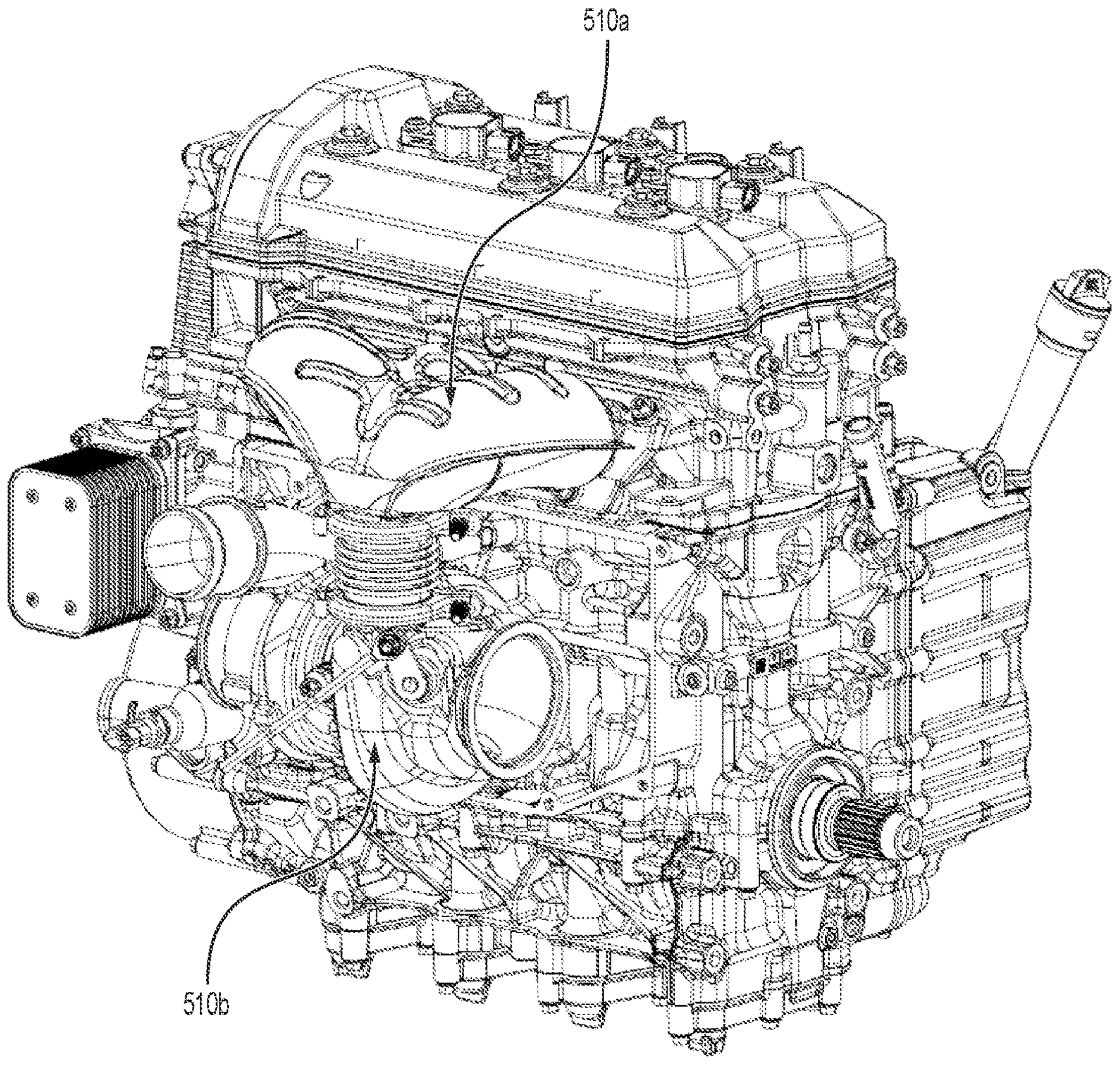
FIG. 6A is perspective view of the ORV engine assembly highlighting the first layer of the protective shield enclosure for the engine exhaust manifold components and the turbocharger assembly.

As shown in FIGS. 5A, 5B and in the perspective engine assembly view of FIG. 6A, the first layer upper section 510A is configured to cover the engine exhaust manifold 133 while the first layer lower section 510B is configured to cover the turbine housing 158 of the turbocharger 150. The first layers 510A, 510B are designed to generally conform to the overall shapes and contours of the engine exhaust manifold 133 and turbocharger 150 surfaces, respectively. As described in greater detail below, the conforming design assists in minimizing the overall size of enclosure 500 within the limited space of the engine bay.

The covering of the engine exhaust manifold 133 by the first layer upper section 510A and the covering of the turbocharger 150 of the first layer lower section 510B is implemented by mounting or positioning the conforming first layers 510A, 510B over the surfaces of the exhaust manifold 133 and turbocharger 150. As such, the first layers 510A, 510B are respectively spaced apart from the surfaces of the exhaust manifold 133 and turbocharger 150 to accommodate the insertion of an insulating material (e.g., mineral wool) therebetween. In some embodiments, the spacing between the first layers 510A, 510B and the respective exhaust manifold 133 and turbocharger 150 surfaces is configured to be between approx. 10-20 mm, and in certain embodiments, around 13 mm.

Figure 6B:
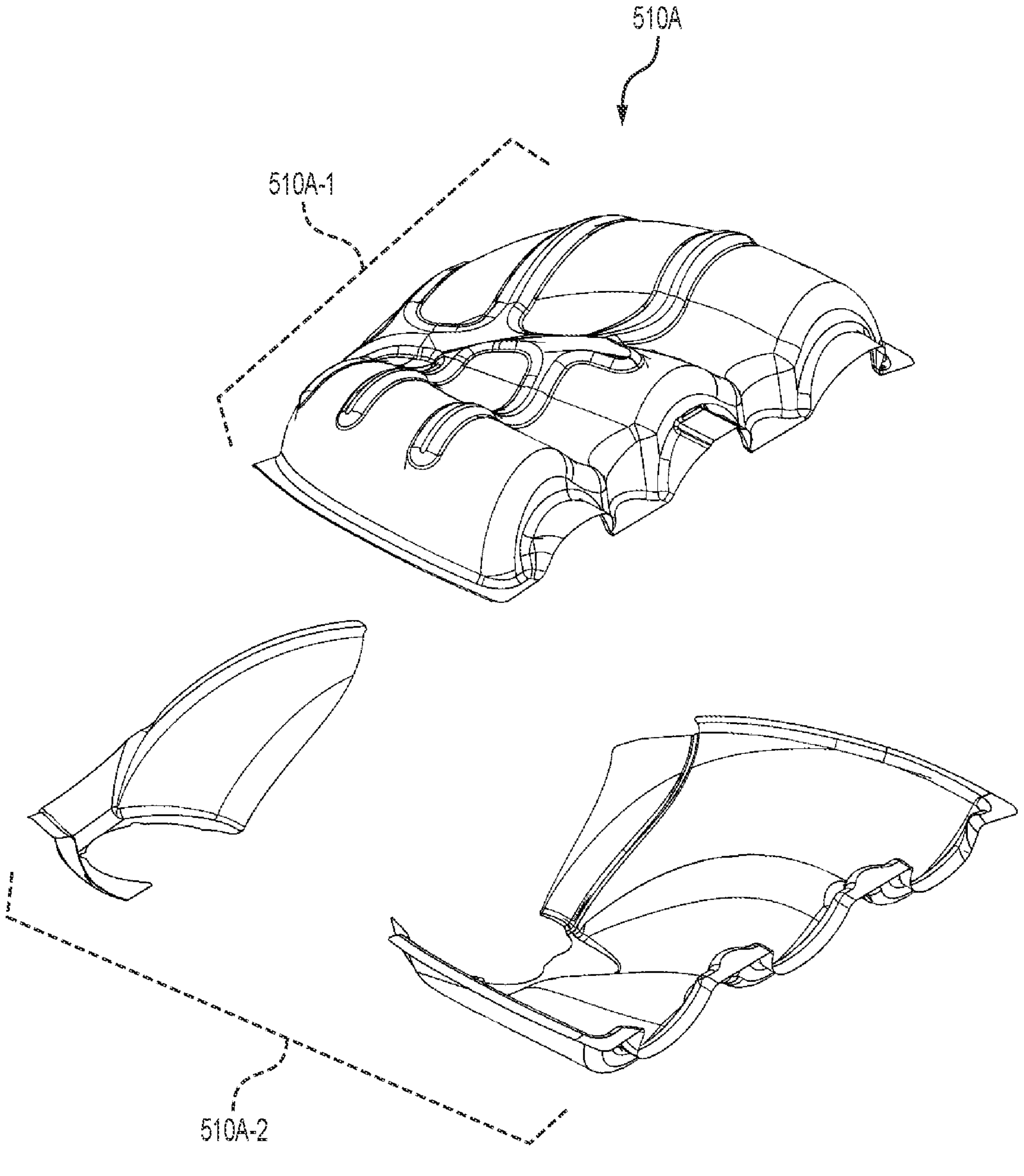
FIG. 6B is an exploded view of the constituent portions of the first layer of the protective shield enclosure for the engine exhaust manifold components.

FIG. 6B depicts an exploded view of the constituent portions comprising the first layer 510A, in accordance with the various embodiments of the present disclosure. As shown, the constituent first layer portions 501A-1, 510A-2 are designed to generally conform to the overall shapes and contours of the engine exhaust manifold 133 and turbocharger 150 surfaces, respectively. The first layers 510A, 510B may be embodied by sheet steel or other suitable materials having malleable properties capable of being pressed, molded, or otherwise formed to generally conform to the overall shapes and contours of the engine exhaust manifold 133 and turbocharger 150 surfaces.

Moreover, as depicted by FIG. 6B, the first layer upper section 510A generally comprises top and bottom portions 501A-1, 510A-2 that manifest a general V-shaped profile conforming to the general shape of the engine exhaust manifold 133. In particular, the top and bottom portions 501A-1, 510A-2 are configured to have a wider lateral dimension at a first end to accommodate the shape of the engine exhaust manifold 133 that interfaces with the engine block 115. The top and bottom portions 501A-1, 510A-2 then taper down to a narrower lateral second end to accommodate the shape of the engine exhaust manifold 133 that interfaces with exhaust coupling conduit 220. Additionally, as shown, the top and bottom portions 501A-1, 510A-2 of the first layer upper section 510A are further configured with curved outer surfaces that conform to the tubular structure profile of the engine exhaust manifold 133.

Returning to the cross-sectional view of FIGS. 5A, 5B, dual-layered protective heat shield enclosure 500 further comprises a second layer 520. As best seen in the perspective engine assembly view of FIG. 7A, in accordance with the embodiments of the present disclosure, the second layer 520 functions as an overall enclosure that covers the engine exhaust manifold 133 and corresponding first layer upper section 510A as well as the turbocharger 150 and corresponding first layer lower section 510B.

Figure 7A:
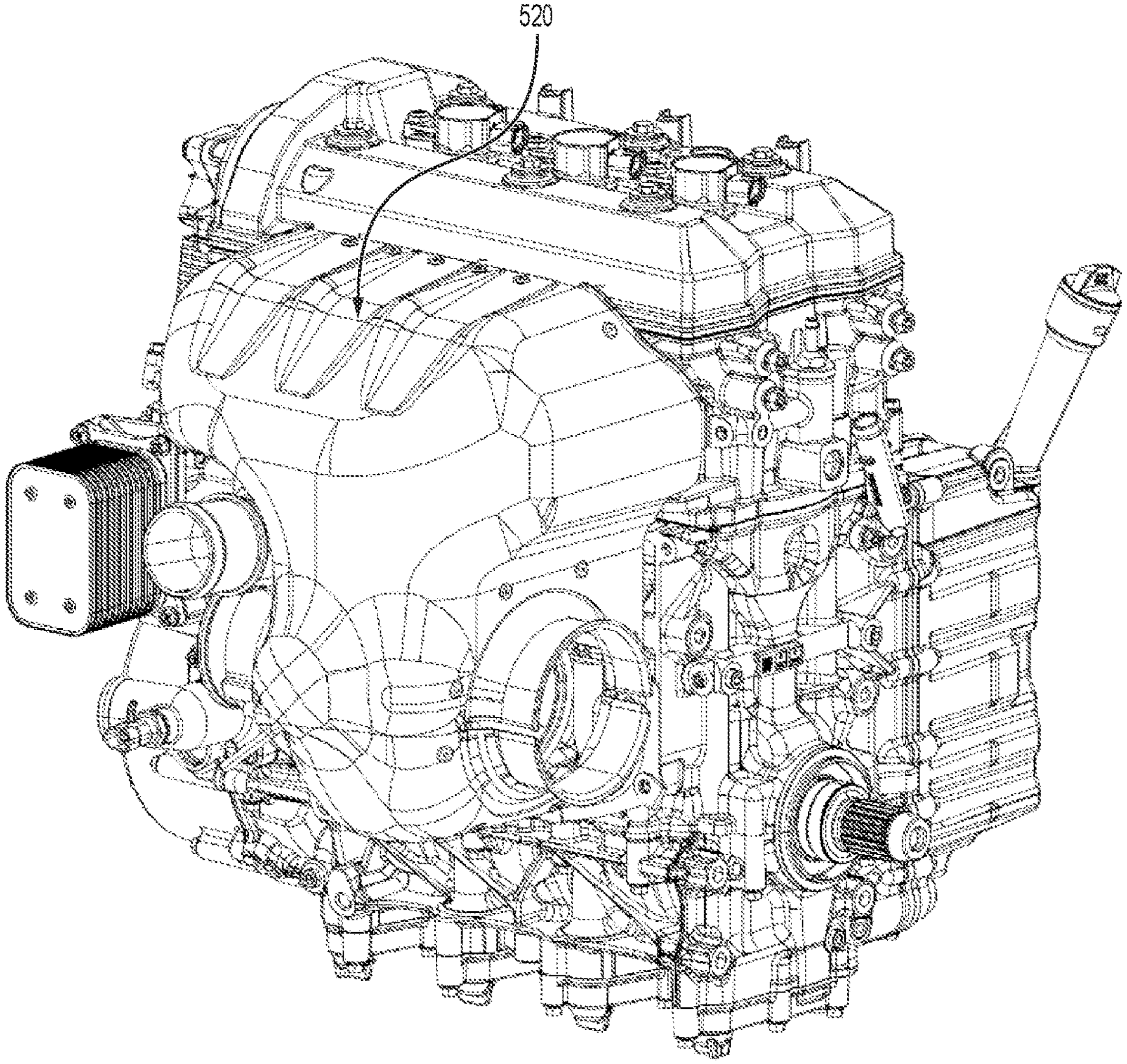
FIG. 7A is a perspective view of the ORV engine assembly highlighting the second layer of the protective shield enclosure for the engine exhaust manifold components and the turbocharger assembly.

Turning to FIG. 7A, the second layer 520 comprises an integrated structure generally manifesting curved and/or rounded surfaces to minimize any level horizontal surfaces. By virtue of the curved/rounded surfaces, the second layer 520 significantly reduces the likelihood of environmental materials adhering to, or becoming trapped, near the high temperatures of the exhaust manifold 133 and/or turbocharger 150.

The covering by the second layer 520 of the engine exhaust manifold 133, the first layer upper section 510A, the turbocharger 150, and the first layer lower section 510B is implemented by mounting or positioning the second layer 520 over the surfaces of the first layers 510A, 510B, such that a relatively limited interstitial spacing or air gap is maintained between the second layer 520 and first layers 510A, 510B. The second layer 520 air gap provides favorable insulation against heat conduction. In some embodiments, the air gap measurement may be configured to be between approx. 1-5 cm, and in certain embodiments, around 3 cm. Moreover, in certain embodiments, the second layer 520 is comprised of a material having a high thermal conductivity properties as well as being malleable, such as, for example, aluminum.

Figure 7B:
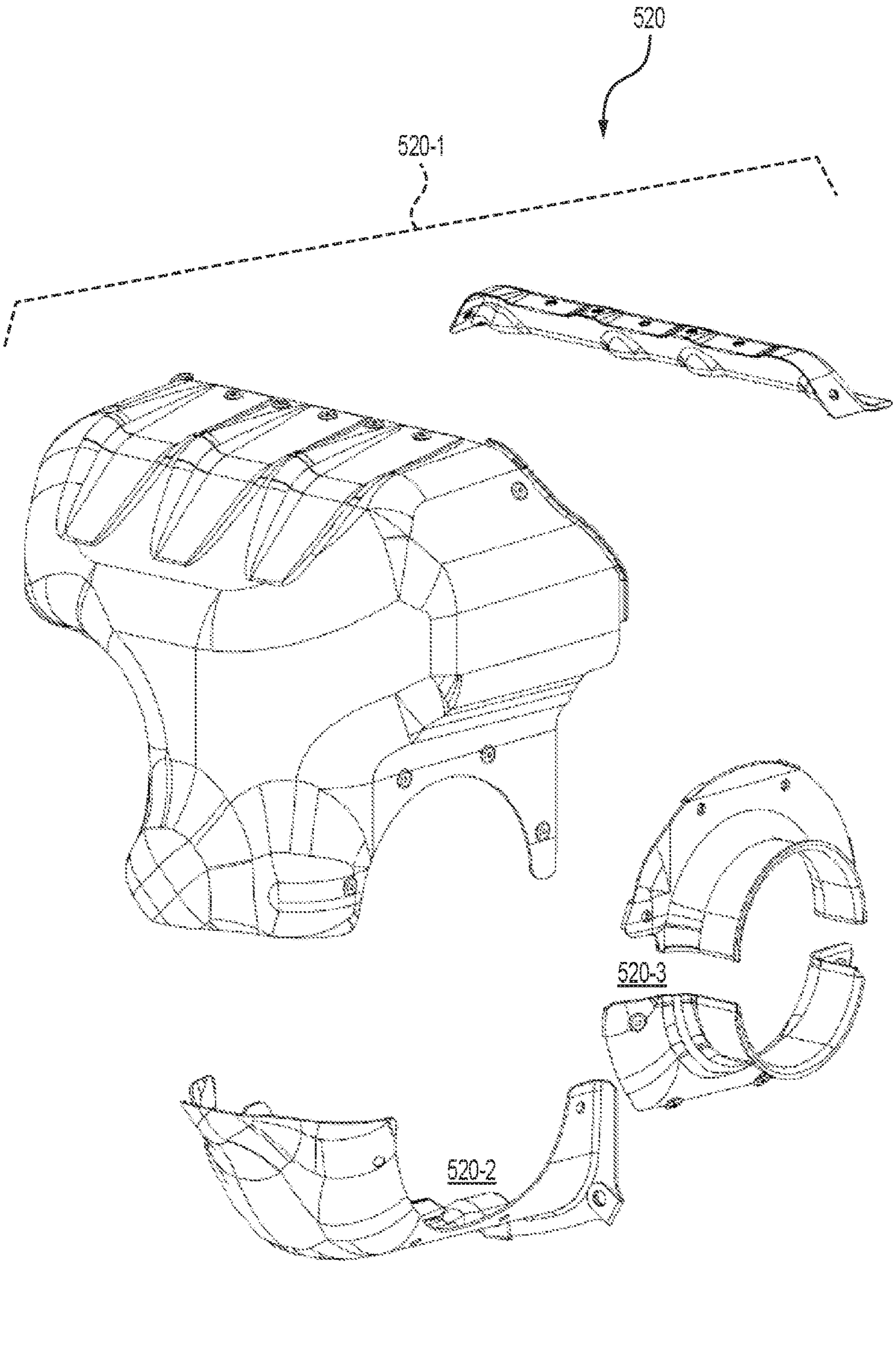
FIG. 7B is an exploded view of the constituent portions of the second layer of the protective shield enclosure for the engine exhaust manifold components and the turbocharger assembly.

FIG. 7B depicts an exploded view of the constituent portions comprising the second layer 520, in accordance with the various embodiments of the present disclosure. As shown, the constituent portions of the second layer 520, namely, main body section 520-1, lower body section 520-2, and exhaust gas outlet 520-3 section are generally designed with curved and/or rounded surfaces. These constituent sections of the second layer 520 may be embodied by sheet aluminum or other suitable heat conductive materials having malleable properties capable of being pressed, molded, or otherwise formed to generally conform to the curved and/or rounded surfaces of second layer 520.

Moreover, as depicted, the main body section 520-1 generally comprises a top end configured to have a wider lateral dimension to accommodate the shape of the engine exhaust manifold 133 and then laterally tapers down along the vertical direction to accommodate the shape of an upper portion of the turbocharger 150. The main body section 520-1 may also include an attachment bracket to secure to the engine cylinder block 115 or other suitable surface. The lower body section 520-2 is configured with a general concave surface that accommodates the rounded shape of a lower portion of the turbocharger 150. The lower body section 520-2 also includes top end edges arranged to mate with the lower end edges of the main body portion 520-1.

In turn, the exhaust gas outlet 520-3 section of the second layer 520 is configured with a general collar-shaped profile with a flared, flat attachment surface. The exhaust gas outlet 520-3 is arranged to accommodate the shape of turbocharger exhaust outlet 163.

By virtue of the dual-layered protective heat shield enclosure 500 configuration, the curved and/or rounded outer surface of the second layer 520 significantly reduces the likelihood of environmental materials adhering to, or becoming trapped, near the high temperatures of the exhaust manifold 133 and/or turbocharger 150.

Equally notable, during ORV operations, the dual-layered protective heat shield enclosure 500 configuration operates to first partially diminish the high temperatures generated by the flow of exhausted gases through exhaust manifold 133 and turbocharger 150 due to the first layers 510A, 510B and intervening insulation material. In turn, the partially diminished temperatures radiating from the first layers 510A, 510B are substantially reduced by the second layer 520 air gap, such that the outer surface of the second layer 520 manifests a temperature (e.g., approx. between 165° C. and 175° C.), which is generally below igniting temperatures of environmental materials. Also, as the ORV is in motion, the air flow naturally generated throughout the engine bay (e.g., approx. 2-5 m/s) assists in dissipating the temperature of the second layer 520 outer surface to the ambient air.

Figure 8:
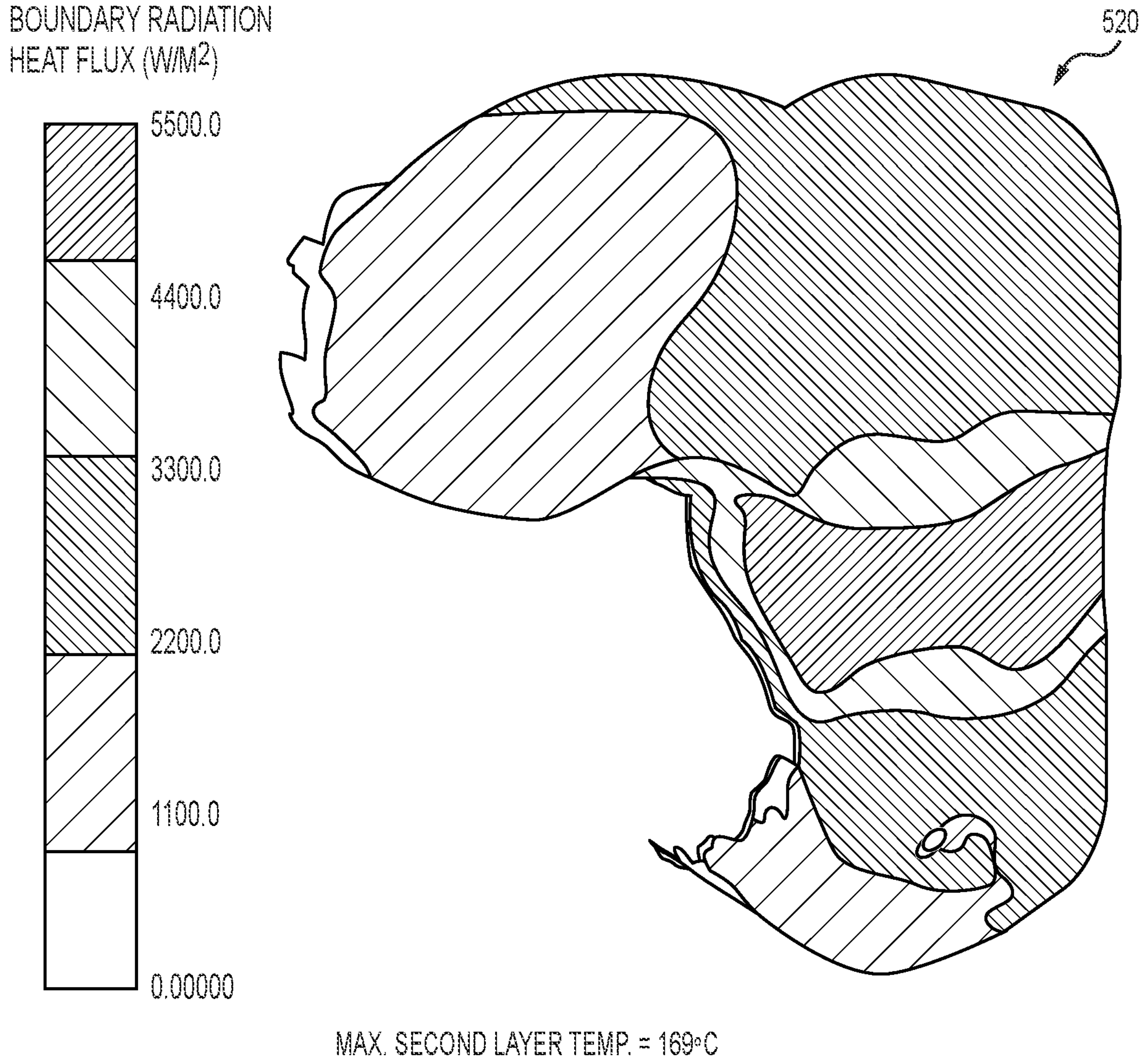
FIG. 8 depicts an empirical thermal gradient profile of the outer surface of the protective shielding second layer.

By way of empirical observations, FIG. 8 depicts the thermal gradient profile of the outer surface of the protective shielding second layer 520 during ORV operations according to an exemplary embodiment. As indicated, during ORV operations, the outer surface of the protective shielding second layer 520 exhibits a thermal gradient profile that is approx. between 165° C. and 175° C.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An engine assembly for a vehicle, comprising:

an internal combustion engine including an exhaust manifold configured to discharge exhaust gases;

a turbocharger, coupled to the exhaust manifold via an exhaust coupling conduit, configured to receive the discharged exhaust gases to drive the turbocharger to produce compressed air delivered to the engine;

a dual-layered heat shield comprising:

a first heat shield layer including:

an upper section arranged to cover the engine exhaust manifold; and a lower section arranged to cover a portion of the turbocharger;

wherein, the first heat shield layer upper and lower sections are configured to conform to general shapes of the engine exhaust manifold and turbocharger surfaces, respectively; and a second heat shield layer covering the first heat shield layer upper and lower sections, the second heat shield layer including:

an outer surface configured with a curved shape to accommodate the shapes of the first heat shield layer upper and lower sections for coverage;

wherein, the second heat shield layer is disposed to be spaced apart from the first heat shield layer upper and lower sections by an air gap of at least 10 mm, the first heat shield layer upper and lower sections being formed from sheet steel with malleable properties, the second heat shield layer being formed from sheet aluminum having a greater thermal conductivity than the sheet steel.

2. The engine assembly of claim 1, wherein the first heat shield layer upper and lower sections are spaced apart from the engine exhaust manifold and turbocharger surfaces; and further comprising a heat-insulating material inserted between:

the first heat shield layer upper section and the engine exhaust manifold, and the first heat shield layer lower section and the portion of the turbocharger.

3. The engine assembly of claim 2, wherein a spacing between the first heat shield layer upper and lower sections and the engine exhaust manifold and turbocharger surfaces, respectively, is configured to be between 10-20 mm.

4. The engine assembly of claim 1, wherein the air gap is configured to be between 1-5 cm.

5. The engine assembly of claim 1, wherein the first and second heat shield layers are arranged and configured to control a temperature of an outer surface of the second heat shield layer to be between 165° C. and 175° C. during operations.

6. The engine assembly of claim 1, wherein the first heat shield layer upper section comprises top and bottom portions that are each configured with a shape having a wider lateral dimension at a first end to accommodate the shape of the engine exhaust manifold that interfaces with an engine block that tapers down to a narrower lateral second end to accommodate the shape of the engine exhaust manifold that interfaces with the exhaust coupling conduit.

7. The engine assembly of claim 1, wherein the second heat shield layer further comprises:

a main body section including a top end configured to have a wider lateral dimension to accommodate the engine exhaust manifold and laterally tapers down along a vertical direction to accommodate the shape of an upper portion of the turbocharger;

a lower body section configured with a generally concave surface to accommodate a rounded shape of a lower portion of the turbocharger; and an exhaust gas outlet section of the second heat shield layer being configured with a generally collar-shaped profile to accommodate the shape of a turbocharger exhaust outlet.

8. The engine assembly of claim 2, wherein the heat-insulating material comprises mineral wool.

9. An off-road vehicle (ORV) comprising the engine assembly of claim 1.

10. A dual-layered heat shield for a turbocharged engine, comprising:

a first heat shield layer including:

an upper section arranged to cover an exhaust manifold of the engine; and a lower section arranged to cover a portion of the turbocharger, the first heat shield layer upper and lower sections being configured to conform to general shapes of the engine exhaust manifold and turbocharger surfaces, respectively; and a second heat shield layer covering the first heat shield layer upper and lower sections, the second heat shield layer including:

an outer surface configured with a curved shape profile to accommodate the shapes of the first heat shield layer upper and lower sections for coverage, and the second heat shield layer being disposed to be spaced apart from the first heat shield layer upper and lower sections by an air gap of at least 10 mm, the first heat shield layer upper and lower sections being formed from sheet steel with malleable properties, the second heat shield layer being formed from sheet aluminum having a greater thermal conductivity than the sheet steel.

11. The heat shield of claim 10, wherein the first heat shield layer upper and lower sections are arranged to be spaced apart from the engine exhaust manifold and turbocharger surfaces, respectively, with a heat-insulating material inserted therebetween.

12. The heat shield of claim 11, wherein a spacing between the first heat shield layer upper and lower sections and the engine exhaust manifold and turbocharger surfaces, respectively, is configured to be between 10-20 mm.

13. The heat shield of claim 10, wherein the air gap is configured to be between 1-5 cm.

14. The heat shield of claim 10, wherein the first heat shield layer upper section comprises top and bottom portions that are each configured with a shape having a wider lateral dimension at a first end to accommodate the engine exhaust manifold interfacing with an engine block and a shape that tapers down to a narrower lateral second end to accommodate the engine exhaust manifold interfacing with an exhaust coupling conduit.

15. The heat shield of claim 10, wherein the second heat shield layer further comprises:

a main body section including a top end configured to have a wider lateral dimension to accommodate the engine exhaust manifold and laterally tapers down along a vertical direction to accommodate the shape of an upper portion of the turbocharger;

a lower body section configured with a generally concave surface to accommodate a rounded shape of a lower portion of the turbocharger; and an exhaust gas outlet section of the second heat shield layer being configured with a generally collar-shaped profile to accommodate the shape of a turbocharger exhaust outlet.

16. An off-road vehicle (ORV) comprising the heat shield of claim 10.

* * * * *